(12) United States Patent
Gomez (10) Patent No.: US 12,414,486 B2
(45) Date of Patent: Sep. 16, 2025

(54) 360 DEGREE LANDSCAPING TOOL

(71) Applicant: Manuel M. Gomez, Twain Harte, CA (US)

(72) Inventor: Manuel M. Gomez, Twain Harte, CA (US)

( * ) Notice: Subject to any disclaimer, the term of this patent is extended or adjusted under 35 U.S.C. 154(b) by 682 days.

(21) Appl. No.: 17/825,461

(22) Filed: May 26, 2022

(65) Prior Publication Data

US 2022/0377957 A1   Dec. 1, 2022

Related U.S. Application Data

(60) Provisional application No. 63/193,955, filed on May 27, 2021.

(51) Int. Cl.
*A01B 1/08*   (2006.01)
*A01B 1/22*   (2006.01)
*A01G 3/06*   (2006.01)

(52) U.S. Cl.
CPC .............. *A01B 1/08* (2013.01); *A01B 1/22* (2013.01); *A01G 3/06* (2013.01)

(58) Field of Classification Search
CPC .. A01B 1/08; A01B 1/22; A01D 34/84; A01G 3/06; B25G 1/04
See application file for complete search history.

(56) References Cited

U.S. PATENT DOCUMENTS

| | | | | |
|---|---|---|---|---|
| 620,909 A | * | 3/1899 | Gerlach | A01G 3/06 172/182 |
| 910,111 A | * | 1/1909 | Carter | A01G 3/06 172/16 |
| 1,763,339 A | * | 6/1930 | Beck | A01G 3/06 172/15 |
| 2,506,366 A | * | 5/1950 | Korn | A01G 3/06 172/15 |
| 2,634,667 A | * | 4/1953 | Woolwine | A01G 3/06 172/186 |
| 2,890,525 A | * | 6/1959 | Altendorf | A01G 3/06 172/15 |
| 3,139,940 A | * | 7/1964 | Randell | A01G 3/06 172/15 |
| 5,951,078 A | * | 9/1999 | Whitehead | E01H 5/02 294/54.5 |
| 6,516,598 B1 | * | 2/2003 | Notaras | A01D 34/001 56/16.7 |

* cited by examiner

*Primary Examiner* — Christopher J Sebesta
*Assistant Examiner* — Audrey L Lusk (57) ABSTRACT

A landscaping tool comprising a disc rotatably attached to an attachment end of an arm. The disc comprises a sharp edge, allowing for cutting, breaking, severing, etc. of various landscape features during lateral and rotational movement of the disc. The arm further comprises a handle and an angled section. The handle allows a user to grasp the arm and swing or otherwise control the arm and disc. The angled section of the arm creates an ideal angle between the disc and arm, allowing for most effective use of the invention for cutting and other landscaping purposes.

13 Claims, 9 Drawing Sheets

360 DEGREE LANDSCAPING TOOL

FIELD OF THE INVENTION

The present invention relates generally to a landscaping tool to cultivate the surrounding land. More specifically, the present invention is a device that utilizes a concave disc 1 to manipulate the ground easily and efficiently.

BACKGROUND OF THE INVENTION

For many years landscapers and gardeners have utilized and stuck with the same tools for manipulating the ground in the desired way. Over countless years many of these tools have not grown and developed much along with the development of technology. This leaves individuals stuck with using tools that are limited in only performing about on to three functions. Using a hoe tool for instance can only be used to remove weeds by shaving them off and cannot be utilized to be an edger, to scoop the dirt in the ground, to create planting furrows, and to cultivate the ground for planting. The other issue with many regular garden and landscaping tools is that many of them are limited to one size. This causes a problem for people who are of different heights and strengths attempting to use the same tool. A tool that is not properly size for an individual can result in less efficient use of the tool or even in potential injury by misusing the tool. Many of these individuals require a tool that allows for versatility in the way it can be used and versatility in the usable length.

An objective of the present invention is to provide users with a landscaping tool, to help cultivate land in various ways efficiently and easily. The present invention intends to provide users with a device that rotates a concave disc to preform various landscaping needs. In order to accomplish that, a preferred embodiment of the present invention comprises a disc, an arm, and a handle. Further, the handle utilizes a telescopic section to ensure the present invention can be sized for any individual. The present invention will allow the user to improve with the tool and use it in various situations and in various ways. By having alternative embodiments of the present invention with a sturdy 6 ft pole as a one of the telescopic sections, the present invention can be used in multiple different ways. Thus, the present invention is a landscaping tool that can be adjusted to various lengths to ensure the present invention can cultivate land in an efficient and convenient way.

SUMMARY OF THE INVENTION

The present invention is a landscaping and gardening tool to help with various jobs that would normally require a variety of different tools. The present invention seeks to provide users with a device that adjusts in length and utilizes various sized and shaped discs in order to efficiently manipulate the desired land being worked upon. In order to accomplish this the present invention comprises a disc that can rotate 360 degrees to easily dig into the ground, because the 360 degree blade is constantly moving, cutting and working with all edges of the disc. Further, the arm holds the disc and allows it to rotate without the rotation causing the nylon nut to fall off or lock up the disc. Additionally, the handle utilizes a telescopic section to ensure the present invention can be used with people of various heights. Thus, the present invention is a landscaping tool that can be adjusted to various lengths to ensure the present invention can cultivate land in an efficient and convenient way.

DETAIL DESCRIPTIONS OF THE INVENTION

All illustrations of the drawings are for the purpose of describing selected versions of the present invention and are not intended to limit the scope of the present invention.

Figure 1:
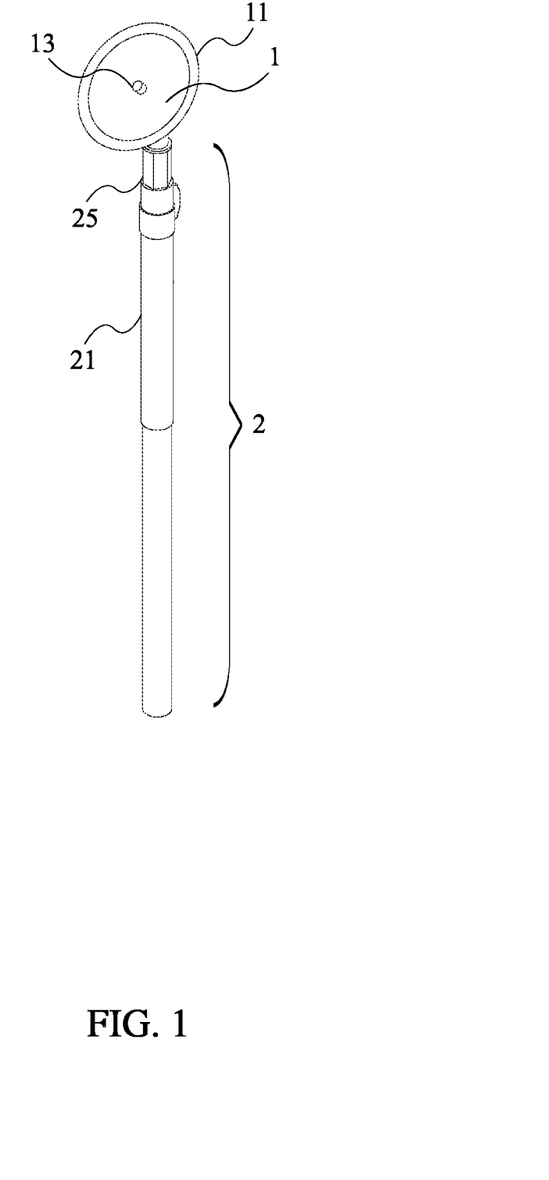
FIG. 1 is a top front perspective view of the present invention in accordance with at least one embodiment.
Figure 2:
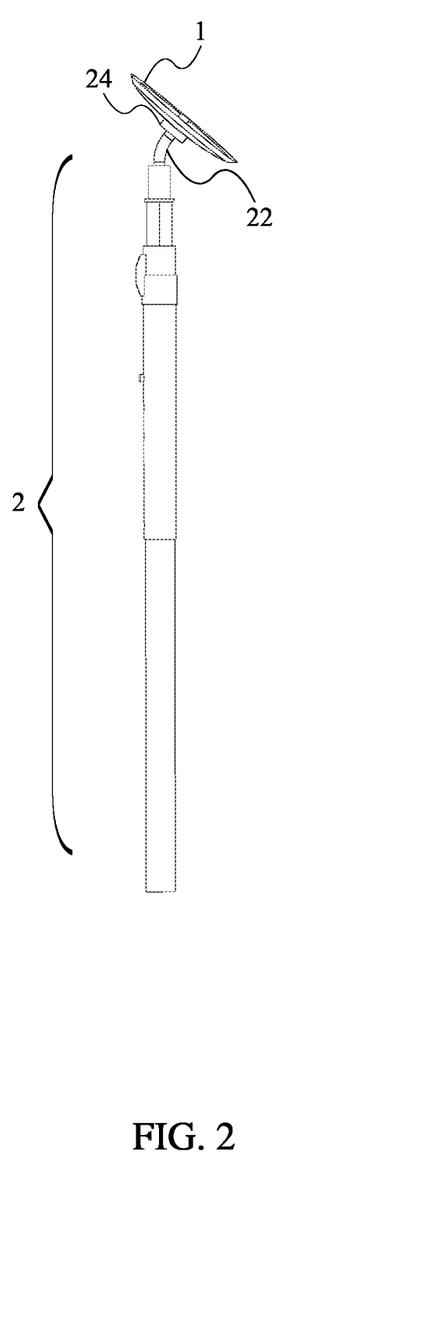
FIG. 2 is a side elevation view of the present invention in accordance with at least one embodiment.
Figure 3:
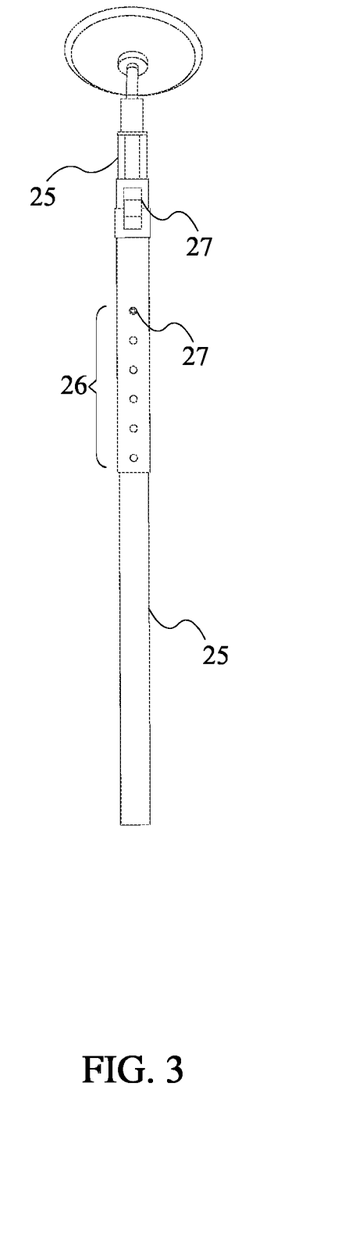
FIG. 3 is a rear elevation view of the present invention in accordance with at least one embodiment.

As shown in FIG. 1, the present invention is a landscaping tool. An objective of the present invention is to provide users with a tool that can utilize various discs and lengths to ensure the present invention can be used in various landscaping and gardening scenarios. To accomplish this, the present invention comprises a disc 1, an arm 2, and a handle 21. Many of these components allow for the present invention to utilize the disc 1 by rotating the bladed edge 11 of the disc 360 degrees to cut into the surrounding ground. The disc 1 is placed on the top of the arm 2 via the disc hole 12. Located on the arm 2, the handle 21 is securely fixed. The nylon nut 13 allows the disc 1 to rotate freely around the arm 2 without loosening or tightening the nylon nut 13 and without falling off the arm 2. Thus, the present invention is a landscaping tool that can be adjusted to various lengths to ensure the present invention can cultivate land in an efficient and convenient way.

Figure 6:
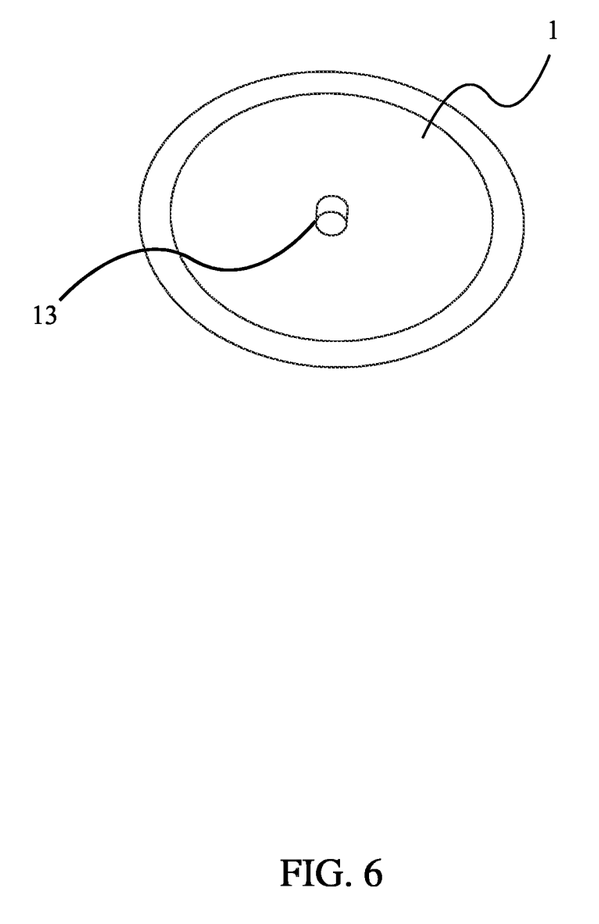
FIG. 6 is a top plan view of the present invention in accordance with at least one embodiment.
Figure 7:
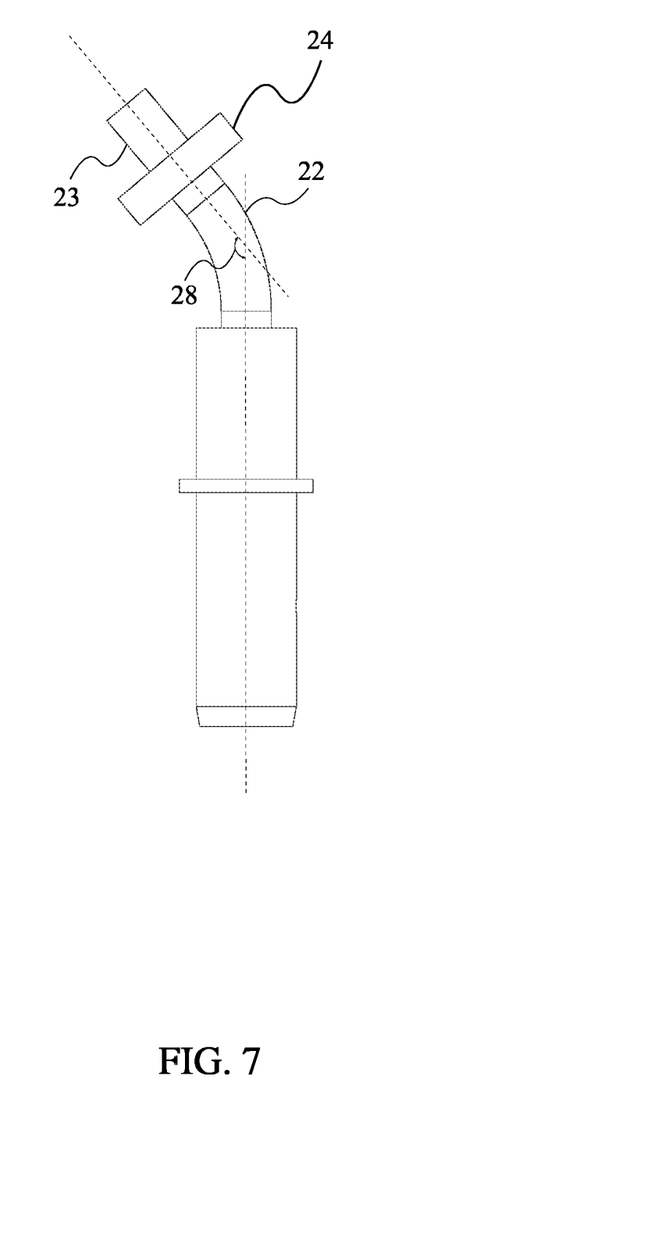
FIG. 7 is a side view of the angled section of the present invention in accordance with at least one embodiment.
Figure 8:
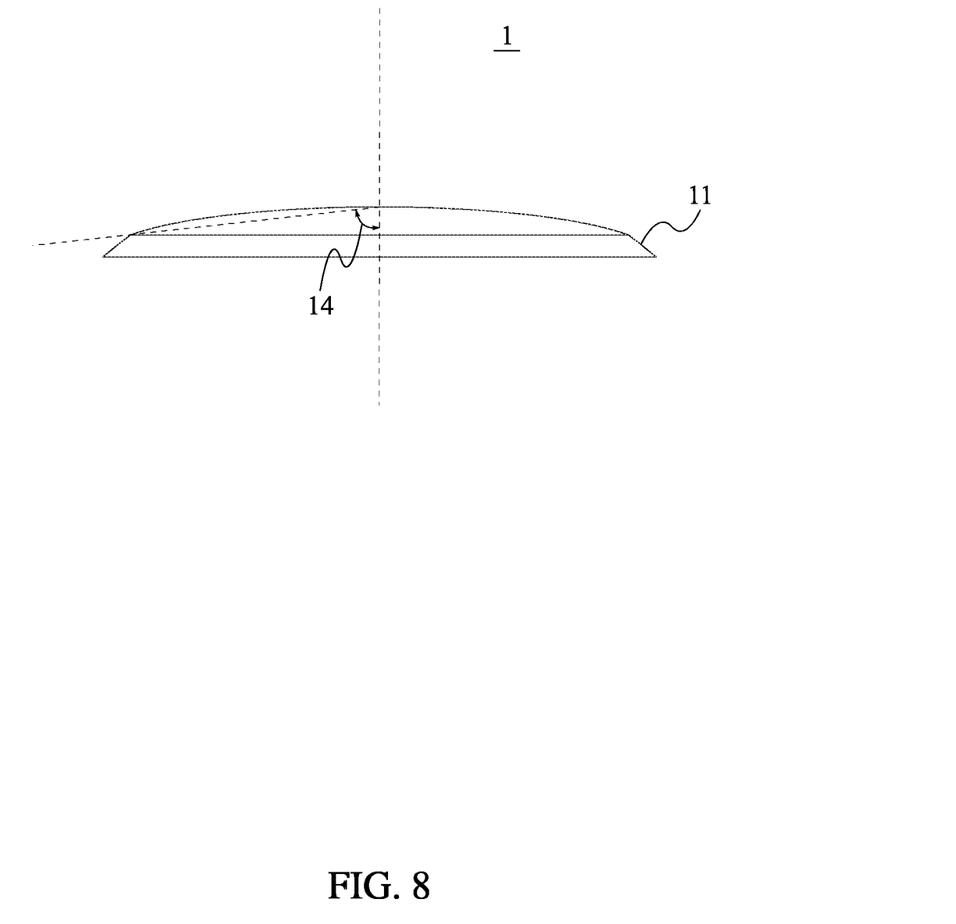
FIG. 8 is a side view of the disc of the present invention in accordance with at least one embodiment.
Figure 9:
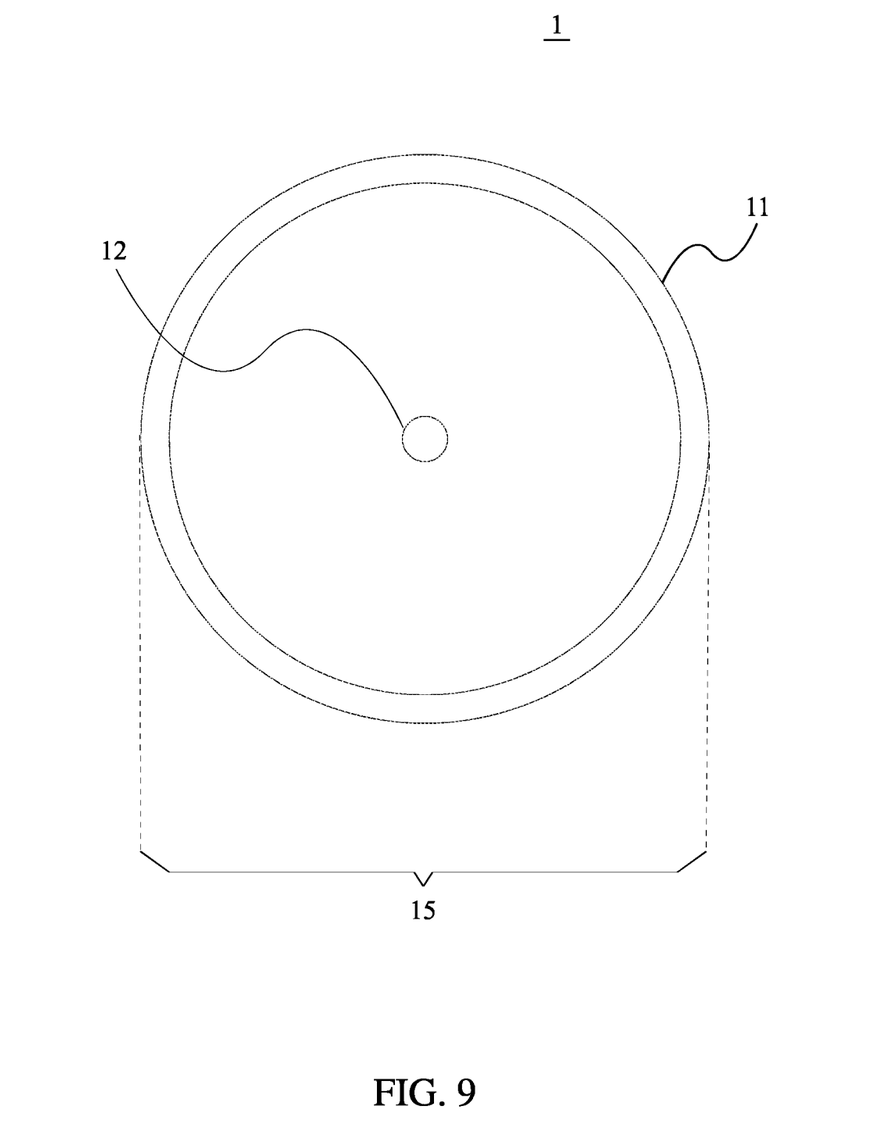
FIG. 9 is a top view of the disc of the present invention in accordance with at least one embodiment.

The present invention can cut through ground during landscaping and gardening projects with the disc 1 component. The disc 1 is made of a top-grade steel material with a circular concave shape as seen in FIG. 1, 6, 8-9. The concave angle 14 of the disc 1 is between 55 and 85 degrees as shown in FIG. 8. The disc 1 is designed with a concave shape where the edge 11 around the disc 1 is pointed into a blade shape that allows the disc 1 to easily cut through ground, roots, etc. In its preferred embodiment the disc 1 comprises a washer, a nylon nut 13, and a disc hole 12. Referring to FIG. 9, the disc 1 can come in various sizes with the diameter 15 of the disc 1 ranging from two to six inches to be used effectively depending on the landscaping project. The washer may be located at the concentric center of the disc 1 as shown in FIG. 6. The washer is made of a metal material and has a wide ring shape with a thin thickness, designed to endure most of the grinding between materials as the disc 1 rotates around the arm 2 to ensure the longevity of the tool. The nylon nut 13 attaches at the attachment end 23 of the arm 2 and holds the disc 1 in place along the arm 2, only allowing for rotational movement. The nylon nut 13 also ensures that as the disc 1 rotates it will not loosen or tighten the nylon nut 13 which would either disable rotational movement or potentially allow the disc 1 to fall off. To ensure that the disc 1 can be placed on the arm 2 properly, the disc hole 12 is designed wherein the center of the disc 1 has a diameter similar to the attachment end 23 of the arm 2. This disc hole 12 is designed to allow the disc 1 to be snugly placed on the arm 2 while allowing for rotational movement around it. It should be further noted that, the disc 1 can be created in many various shapes and sizes and the washer can be positioned is various ways while still staying within the scope of the present invention.

For example, while the disc 1 generally has a circular shape, a disk 1 of the present invention could be square, triangular, or any other shape. Additionally, edge 11 of the disk 1 may be serrated, jagged, or shaped in another manner different from the uniform circular shape of the preferred embodiment.

Figure 4:
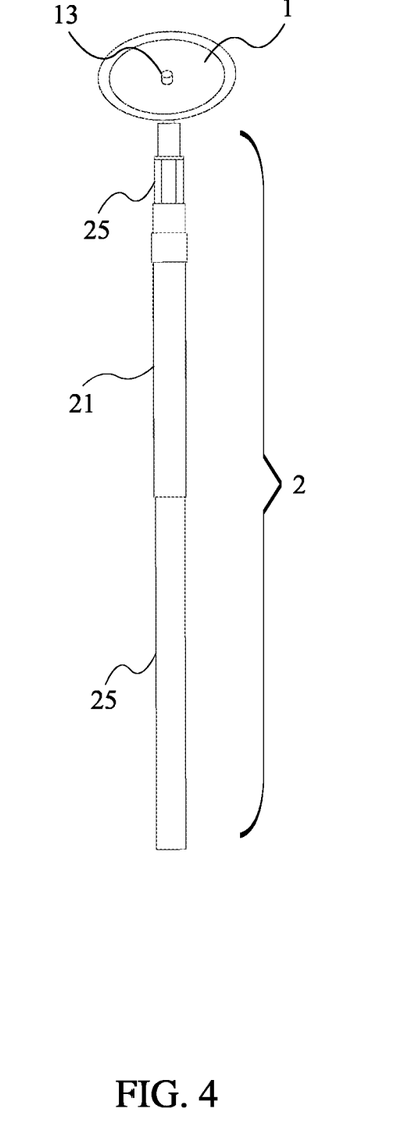
FIG. 4 is a front elevation view of the present invention in accordance with at least one embodiment.
Figure 5:
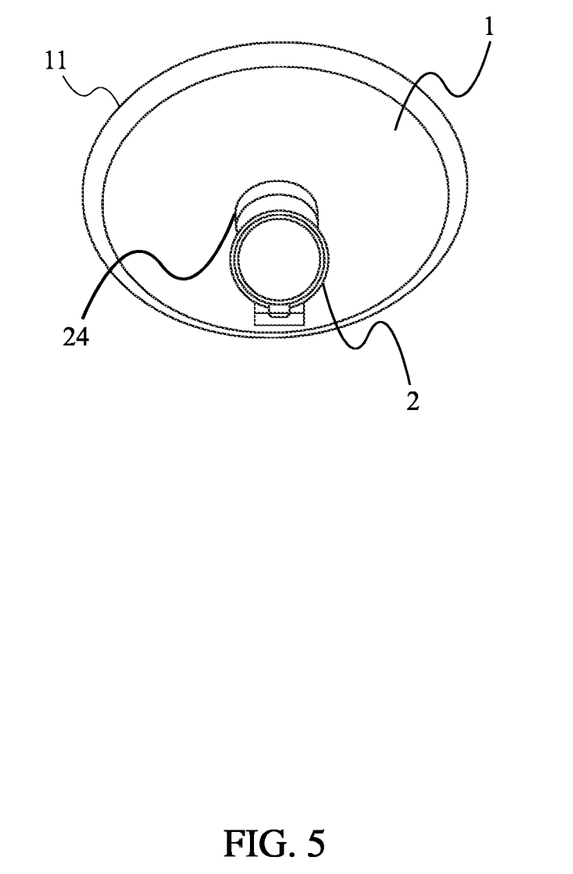
FIG. 5 is a bottom plan view of the present invention in accordance with at least one embodiment.

The arm 2 holds the disc 1 via the attachment end 23 of the arm 2. The arm 2 is made of a steel material with an angled section 22. The angle 28 of the angled section 22 is preferably 135 degrees as seen in FIG. 4. This angle 28 of the angled section 22 is not limited to just 135 degrees and could be larger or smaller without straying from the scope of the present invention, with the most useful range being 135-150 degrees. This angle 28 allows the disc 1 to be rotated in a more efficient manner along the ground. In its preferred embodiment the arm 2 comprises an attachment end 23, a disc holder 24, a hollow section and a screw hole. The attachment end 23 is designed as a spiral cutout that has a mating thread to match the thread of the nylon nut 13. This allows the nylon nut 13 to be properly secured to the arm 2. Below the attachment end 23 is the disc holder 24. The disc holder 24 is located before the angled section 22 of the arm 2 as seen in FIG. 5. This design allows for the disc 1 to be secured on one end with the nylon nut 13 and limited from falling down the arm 2 by the disc holder 24 which has a larger diameter than the disc hole 12. By sandwiching the disc 1 between the nylon nut 13 and the disc holder 24, the disc 1 is secured to the arm 2 and resistant to all movement other than rotational movement about the arm 2. At the bottom half of the arm 2 is the hollow section that allows for the arm 2 to be connected with the handle 21. In order to ensure the handle 21 stays secured onto the arm 2 a screw hole may be positioned on the rear side.

The handle 21 connects with the arm 2 via the portion of the arm 2 below the angled section 22. The handle 21 is made of a durable material with a long cylindrical shaft design. In its preferred embodiment the handle 21 comprises at least one telescopic section 25, including a plurality of holes 26, and at least one spring mechanism 27. The telescopic section 25 is designed as a cylindrical shaft with a diameter slightly smaller than that of the handle 21 allowing for it to slide in and out of the handle 21 to increase or decrease the overall length of the present invention. This design allows for the handle 21 to extend to a greater length to ensure the present invention can be comfortably used by people of various heights with the same efficiency and ease. The telescopic section 25 may be at either end of the handle 21. In one embodiment, there may be a telescopic section 25 attached to the arm 2 near the angled section 22 as well as opposite the angled section 22. In an alternative embodiment the present invention can be designed with an ergonomic handle 21 that can be gripped and held easily by the user. This will allow the present invention to be used for close up precision work where the individual needs to get on their hands and knees to correctly work on the surrounding ground. The plurality of holes 26 is positioned on the rear side of the telescopic section 25 or the handle 21. This design allows for the telescopic section 25 to be extended and retracted to predetermined lengths. The plurality of holes 26 combined with the at least one spring mechanism 27 ensures that the handle 21 can be extended to a certain length and then locked into the desired length. Once the present invention has been used at the desired length and needs to be changed to a different length, one of the at least one spring mechanism 27 can be pushed, unlocking the telescopic section 25 from one of the plurality of holes 26 and extended or retracted to another of the plurality of holes 26 and locked into place again. With all the various components working in tandem with each other it can be seen that the present invention is a landscaping tool that can be adjusted to various lengths to ensure the present invention can cultivate land in an efficient and convenient way.

Although the invention has been explained in relation to its preferred embodiment, it is to be understood that many other possible modifications and variations can be made without departing from the spirit and scope of the invention.

What is claimed is:

1. A landscaping tool, comprising:
    a disc, the disc comprising:
        an edge, the edge of the disc being pointed into a blade shape and being rotatable 360 degrees to cut into surrounding ground;
    an arm;
    the arm further comprising a handle, an angled section, and an attachment end;
    the handle being oppositely positioned on the arm from the attachment end;
    the angled section positioned adjacent to the attachment end, the angled section being 135 degrees relative to the arm thereby allowing the disc to be rotated efficiently along the ground to cut into surrounding ground;
    the disc being freely rotatably attached to the attachment end of the arm;
    a disc holder attached to the arm between the angled section and the attachment end;
    a nylon nut attached to the attachment end of the arm;
    the disc further comprising a disc hole in a center of the disc;
    the disc hole positioned on the attachment end of the arm between the disc holder and the nylon nut, the nylon nut holding the disc in place with a washer along the arm and only allowing rotational movement as the disc rotates 360 degrees to cut into surrounding ground and ensuring that the disc does not loosen or tighten that would disable rotational movement of the disc; and
    the disc hole being smaller in diameter than the disc holder allowing secure attachment of the disc to the arm allowing rotational movement of the disc about the arm as the disc rotates 360 degrees to cut into surrounding ground and preventing non-rotational movement.

2. The landscaping tool of claim 1, wherein the disc has a circular concave shape comprising a concave angle of the disc.

3. The landscaping tool of claim 2, wherein the concave angle of the disc is between 55 and 85 degrees.

4. The landscaping tool of claim 1, further comprising: at least one telescopic section being adjustably slidably attached to the handle and configured to extend and retract relative to the handle.

5. The landscaping tool of claim 4, further comprising:
    the handle further comprising a plurality of holes;

the at least one telescopic section further comprising a spring mechanism; and the spring mechanism being insertably compatible with the plurality of holes.

6. The landscaping tool of claim 1, wherein the diameter of the disc is between 2 and 6 inches.

7. A landscaping tool, comprising:

a disc, the disc comprising:

an edge, the edge of the disc being pointed into a blade shape and being rotatable 360 degrees to cut into surrounding ground;

an arm;

the arm further comprising a handle, an angled section, an attachment end, and a disc holder;

the handle being oppositely positioned on the arm from the attachment end;

a disc holder attached to the arm between the angled section and the attachment end;

the angled section and the disc holder each positioned adjacent to the attachment end, the angled section being 135 degrees relative to the arm thereby allowing the disc to be rotated efficiently along the ground to cut into surrounding ground;

the disc being freely rotatably attached to the attachment end of the arm;

a nylon nut attached to the attachment end of the arm;

the disc further comprising a disc hole in a center of the disc;

the disc hole positioned on the attachment end of the arm between the disc holder and the nylon nut, the nylon nut holding the disc in place with a washer along the arm and only allowing rotational movement as the disc rotates 360 degrees to cut into surrounding ground and ensuring that the disc does not loosen or tighten that would disable rotational movement of the disc; and the disc hole being smaller in diameter than the disc holder allowing secure attachment of the disc to the arm allowing rotational movement of the disc about the arm as the disc rotates 360 degrees to cut into surrounding ground and preventing non-rotational movement.

8. The landscaping tool of claim 7, wherein:

the disc has a circular concave shape; and the diameter of the disc is between 2 and 6 inches.

9. The landscaping tool of claim 7, wherein:

the concave angle of the disc is between 55 and 85 degrees.

10. The landscaping tool of claim 7, further comprising:

the handle further comprising at least one telescopic section adjustably slidably attached to the handle and configured to extend and retract relative to the handle;

the handle further comprising an ergonomic grip;

the handle further comprising a plurality of holes;

the at least one telescopic section further comprising a spring mechanism; and and the spring mechanism being insertably compatible with the plurality of holes.

11. A landscaping tool, comprising:

a disc, the disc comprising:

an edge, the edge of the disc being pointed into a blade shape and being rotatable 360 degrees to cut into surrounding ground;

an arm;

the arm further comprising a handle, an angled section, an attachment end, and a disc holder, the angled section being 135 degrees relative to the arm thereby allowing the disc to be rotated efficiently along the ground to cut into surrounding ground;

a disc holder attached to the arm between the angled section and the attachment end;

a nylon nut attached to the attachment end of the arm;

the disc further comprising a disc hole in a center of the disc;

the disc hole positioned on the attachment end of the arm between the disc holder and the nylon nut, the nylon nut holding the disc in place with a washer along the arm and only allowing rotational movement as the disc rotates 360 degrees to cut into surrounding ground and ensuring that the disc does not loosen or tighten that would disable rotational movement of the disc; and the disc hole being smaller in diameter than the disc holder allowing secure attachment of the disc to the arm allowing rotational movement of the disc about the arm as the disc rotates 360 degrees to cut into surrounding ground and preventing non-rotational movement the disc has a circular concave shape; and the diameter of the disc is between 2 and 6 inches.

12. The landscaping tool of claim 11, further comprising:

the handle further comprising at least one telescopic section adjustably slidably attached to the handle and configured to extend and retract relative to the handle;

the handle further comprising an ergonomic grip;

the handle further comprising a plurality of boles;

the at least one telescopic section further comprising a spring mechanism;

and the spring mechanism being insertably compatible with the plurality of holes.

13. The landscaping tool of claim 12, wherein:

the concave angle of the disc is between 55 and 85 degrees.

* * * * *